J. C. MILLIGAN.
Camp Kettle.
No. 37,456.
3 Sheets—Sheet 1.
Patented Jan. 20, 1863.
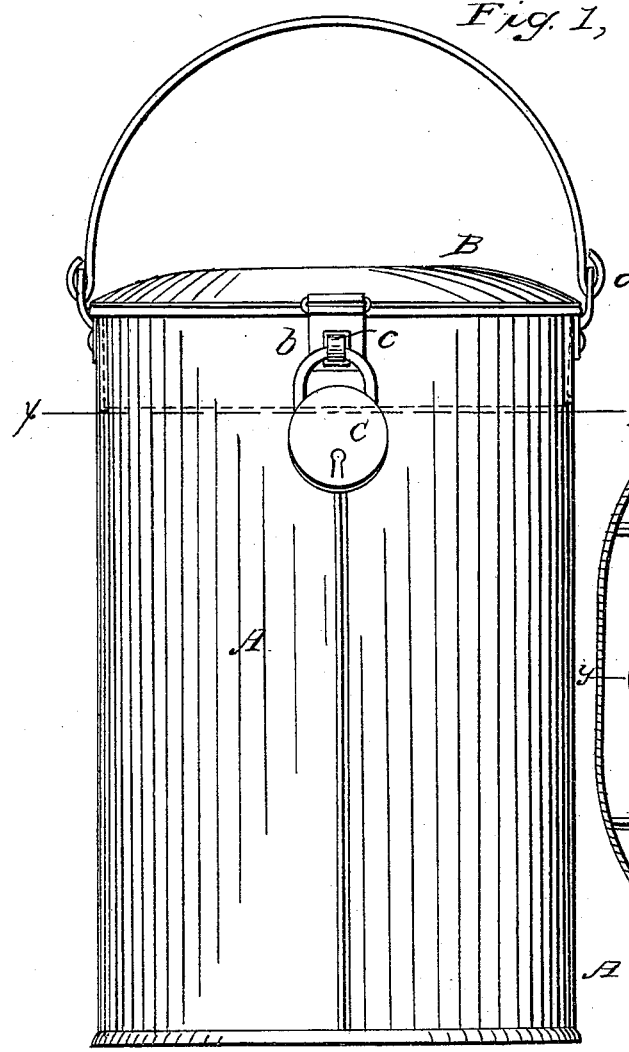
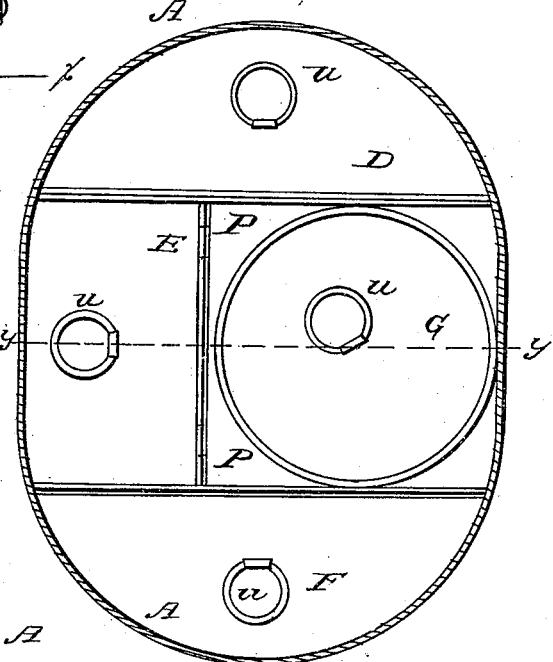
WITNESSES:
JC McIntire
A P Demelt
INVENTOR:
Jno C Milligan

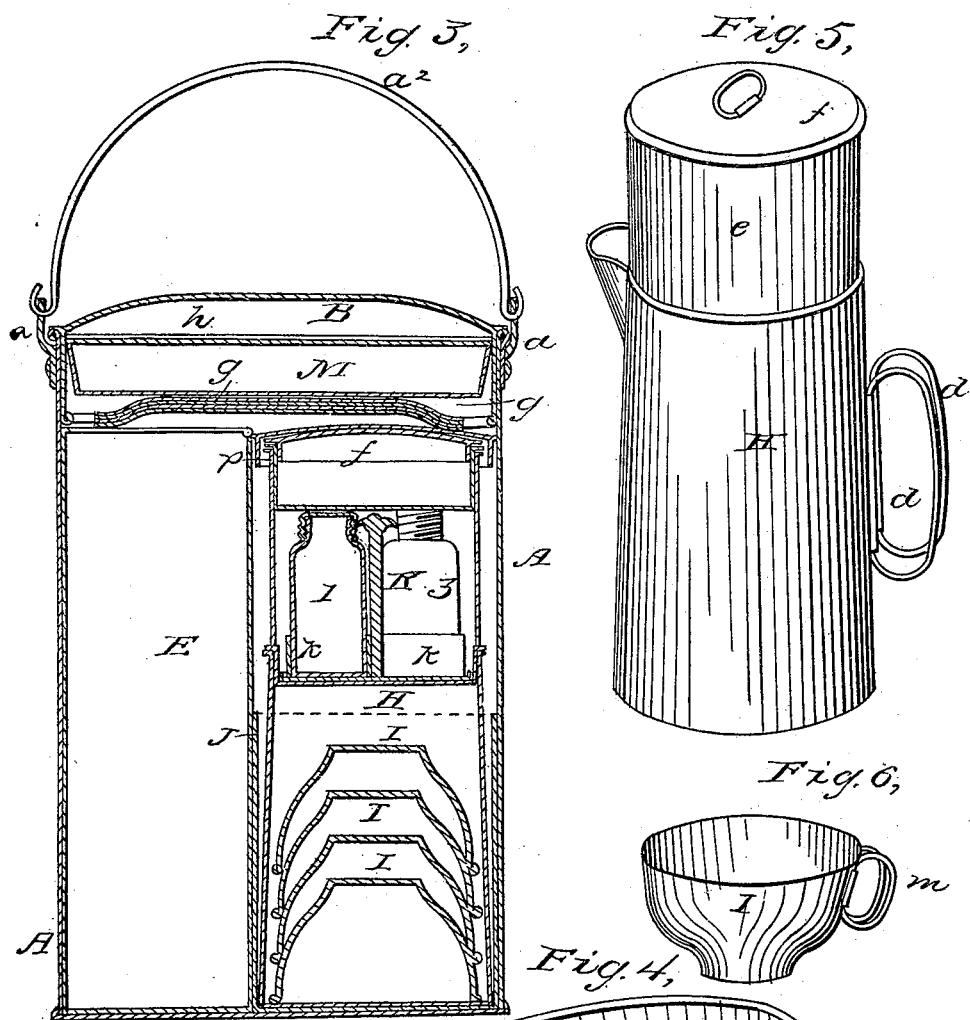

J. C. MILLIGAN.
Camp Kettle.
No. 37,456.
3 Sheets—Sheet 3.
Patented Jan. 20, 1863.
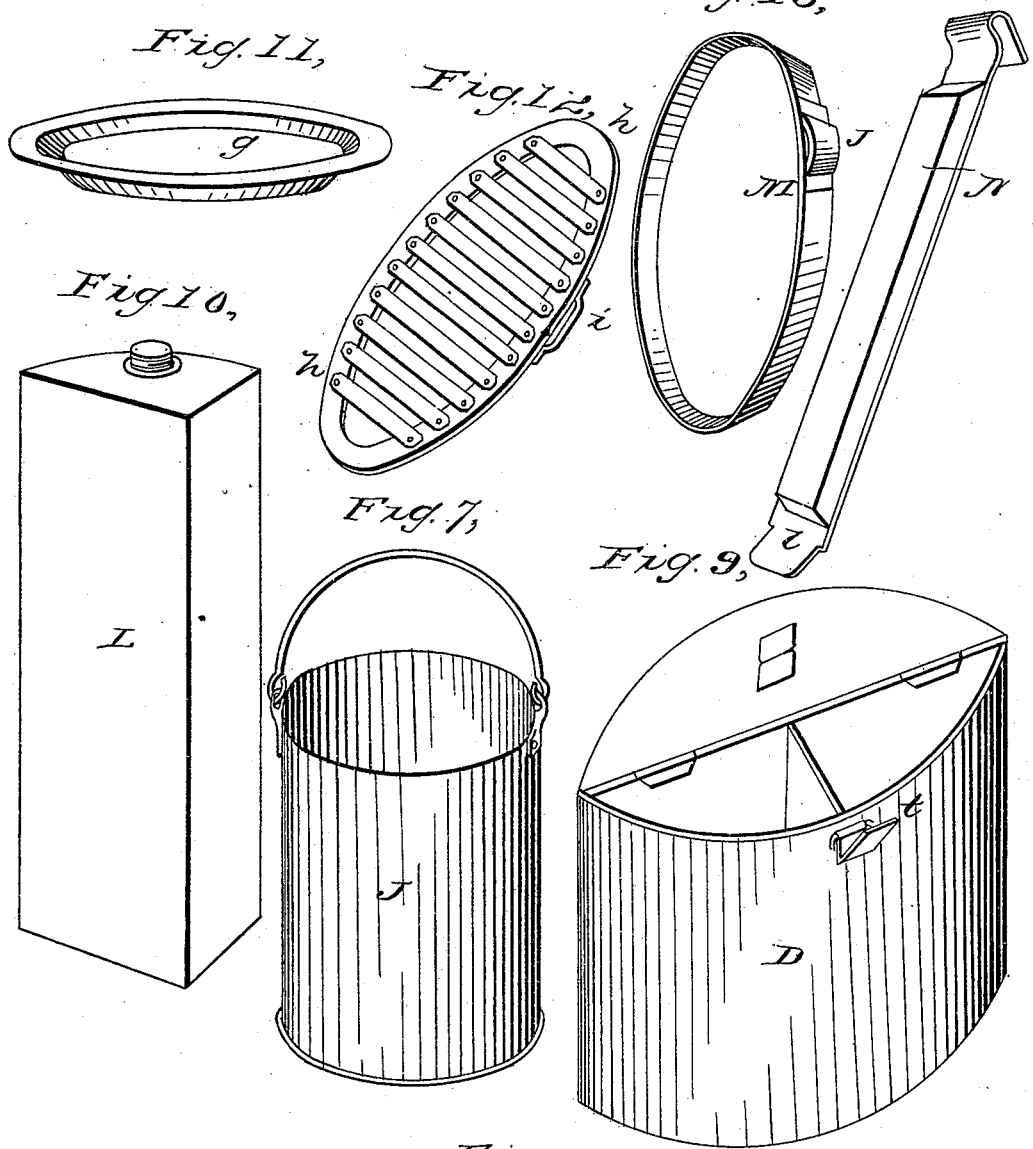

UNITED STATES PATENT OFFICE.

JOHN C. MILLIGAN, OF ELIZABETH CITY, NEW JERSEY.

IMPROVEMENT IN CAMP-KETTLES.

Specification forming part of Letters Patent No. 37,456, dated January 20, 1863.

*To all whom it may concern:*

Be it known that I, JOHN C. MILLIGAN, of Elizabeth City, of Union county, in the State of New Jersey, have invented certain new and useful Improvements in Camp-Kettles; and I do hereby declare that the following is a full and exact description thereof, reference being had to the accompanying drawings, making part of this application.

My invention relates to certain improvements in that kind of apparatus designated a "camp-kettle," and designed to supply the purposes of a "camp-chest." It has been found by experience that chests, such as have been employed for containing the necessary utensils for camp use, often prove cumbersome, and that often they have been lost during quick movements, on account of being so burdensome in transportation. It has long been looked upon as a great desideratum to produce some light and convenient article as a substitute for the camp-chest, and to this end various kinds of camp kettles have been devised and employed, some of which have been constructed and arranged so as to embrace a minute stove and some cooking utensils. The great practical difficulties in the production of such an article perfectly adapted to army use have been in making the camp-kettle sufficiently light and compact and have it embody all the necessary articles or implements, and also in producing it at a reasonably small cost.

My invention has for its object to overcome to a great extent, if not completely, these difficulties; and to this end my invention consists in certain novel combinations and arrangements of devices, as hereinafter fully described, whereby I am enabled to make a kettle to embody every useful and necessary utensil, while at the same time it is exceedingly light, economical, and easy of transportation.

To enable those skilled in the art to make and use my invention, I will proceed to describe the construction and operation of one of my improved camp-kettles, referring by letters and figures to the accompanying drawings, forming part of this application, and in which—

Figure 1 is an elevation of the apparatus put up in condition to be carried or transported. Fig. 2 is a horizontal section at the line $x\,x$, Fig. 1. Fig. 3 is a vertical section at the line $y\,y$, Fig. 2. Fig. 4 is a detail view, in perspective, of the kettle-cover. Fig. 5 is a perspective, view of a coffee-pot. Fig. 6 is a perspective view of one of the cups. Fig. 7 is a perspective view of the saucepan. Fig. 8 is a side elevation of the caster. Fig. 9 is a perspective view of one of the provision-boxes. Fig. 10 is a perspective view of the liquor bottle or flask. Fig. 11 is a perspective view of one of the plates. Fig. 12 is a perspective view of the gridiron. Fig. 13 is a perspective view of the frying-pan, and Fig. 14 is a perspective view of the gridiron and frying pan handle.

Wherever the same part appears in different views or figures it is designated by the same letter of reference.

A is a kettle of the shape shown in the drawings. It is provided with ears $a\,a$ at its top edge, in which is hung the handle $a^2$, by which the kettle is carried or suspended over the fire when used to cook in.

B is the lid or cover to kettle. It is made somewhat convex on top and formed with a very deep flange or rim, which shuts inside of the kettle. On one side of lid B is secured a hasp, $b$, which closes over the staple $c$, through which staple is passed an ordinary small padlock, C, by which the lid B is locked on. It will be observed that the lock on one side only secures the lid B, since the flange of said lid is very deep and fits closely inside of the kettle. The lower edge of the flange of lid B is wired to stiffen it and said lid serves the purposes of a soup-tureen, when inverted, as seen in perspective at Fig. 4.

From Fig. 2 it will be seen that the shape of kettle A, in a horizontal section, is somewhat oval, and within said kettle are arranged the boxes D E F, leaving a square or rectangular vacancy, in which are placed the coffee-pot H and other utensils, as will be presently explained. The boxes D E F extend from the bottom of the kettle up to the lower edge of the flange of lid B, so that when they are packed in, and the lid B in position, as seen at Figs. 1 and 3, the flange of said lid holds the boxes down. The said boxes are all made with hinged covers, provided with suitable catches, (see $t$, Fig. 9,) and with folding handle-rings u. The box E is sufficiently large to contain fresh meat for three or four, (the apparatus being designed for a mess of three or four.) The box F is divided by a vertical partition, and in one compartment is arranged a liquor-flask, L, (see Fig. 10,) having a screw-stopper, s, while in the other compartment are readily packed four knives, four forks, four each of large and small spoons, a cork-screw, &c. The box D, I prefer to make only half the depth of E or F, and arrange under it a duplicate, (with the exception that the upper one is divided by a vertical partition into two compartments for rations of sugar, &c., while the lower one is all in one to contain coffee.)

In the rectangular space left between the boxes and one side of kettle are arranged numerous utensils, in the manner which I will now describe: In said space is placed a saucepan or small kettle, J, (see Fig. 3,) within which is arranged the coffee-pot H, which, with the lid V of saucepan J, on top of it, comes up about flush with the tops of boxes E D F. Over the tops of said boxes and the coffee-pot are arranged the plates $g$. On top of these is placed the frying pan M and gridiron $h$, the whole being firmly held down in place by the cover B. The coffee-pot H is made in three detachable parts with two strainers, so as to make coffee in the most approved and desirable process of cooking. Within the lower compartment of the coffee-pot are packed four coffee-cups, I; and in the middle portion of said coffee-pot is arranged the complete caster K, which may be made with either three or four bottles or cruits. After the cups I and caster K are packed in coffee-pot, there is space left to put in napkins if desired, and inside of the frying-pan M is ample room for a large towel or dish-cloth. The coffee-pot H is made with a handle formed of the two wire loops, $d\,d$, (see Fig. 5,) arranged to turn in sleeves $p$, so as to fold down onto the surface of the pot to allow it to set down in the small kettle J. In one of the corner spaces, P P, (see Fig. 2,) is packed the handle N, which is constructed with two differently-shaped ends, $o$ and $t$, adapted, respectively, to the sockets $j$ and $i$, formed on frying-pan and gridiron. The handles of cups I are constructed in a manner similar to the handle of coffee-pot, (just described,) so as to admit of the said cups being packed over each other, as seen in Fig. 3. The caster I propose to make, as shown, of a tin circular plate with a slight flange turned up around its circumference, suitable little buttons of solder on its lower surface for feed, and a vertical rod projecting up from its center for a handle. On said circular plate may be fastened three or four short vertical tubes or sockets, $k$, in which are placed the bottles 1 2 3, made with metallic screw-tops, and adapted to contain mustard, pepper, salt, &c. The main kettle and receptacle A, I make of very heavy tin, while the utensils inside (and not to be subjected to so much heat) I propose to make lighter.

It will be understood that all the different utensils, when packed and locked in the kettle A, as shown and described, are firmly held in position or effectually locked together, so as to prevent any displacement. The dimensions of the kettle A are: long diameter, eleven inches; short diameter, nine inches; depth, eleven inches. Now, it will be observed that within the kettle of the above dimensions are conveniently packed the following utensils of the most approved style for a mess of four persons, viz: small kettle or saucepan, frying-pan, gridiron, soup-tureen, coffee-pot, (with strainers, &c.,) caster, cups, plates, knives, forks, spoons, towels, liquor-flask, and suitable and separate boxes for all the necessary rations. The entire weight of the kettle with all its appurtenances is eleven pounds, and the space occupied for transportation is in accordance with the above-given dimensions of the main kettle A.

I wish it to be understood that my improved camp-kettle, such as herein described, will cost but about one-fourth the amount which a camp-chest embracing the same conveniences would cost, while it is much more durable than the latter and only involves one-sixth the weight and about one-sixth the space in transportation.

The peculiar shape of the kettle A in the form of an oval is essential, as it will be found rather impractical to combine all the elements of the apparatus in any other shape of kettle with the same advantages as gained by my invention.

I am aware that various articles of manufacture have been packed one within another, (where the nature and sizes of the article admitted of such packing), — as, for instance, "nest" of tubs, dishes, &c.; but I wish it to be understood that there is no such system of packing articles claimed by me. My invention lies in the peculiar adaptation by construction of numerous different articles together in a particular manner for a given purpose; and What I therefore claim as new in my improved camp-kettle, and desire to secure by Letters Patent, is—

The peculiar construction of the dished cover or tureen B, and its arrangement with the kettle A, and together with the coffee-pot H, saucepan J, frying-pan M, gridiron $h$, plates $g$, and ration-boxes D E F, in the manner and for the purpose specified.

In testimony whereof I have hereunto set my hand and affixed my seal this 3d day of September, 1862.

JNO. C. MILLIGAN. [L. S.]

In presence of—
  J. N. McIntire,
  A. P. Demilt.